(12) United States Patent
Matsuo et al.

(10) Patent No.: US 8,702,311 B2
(45) Date of Patent: Apr. 22, 2014

(54) ROTATING MACHINE AND ADDITIONAL RING

(75) Inventors: Takaaki Matsuo, Tokyo (JP); Hideyuki Toda, Tokyo (JP); Taku Ichiryu, Hyogo-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 729 days.

(21) Appl. No.: 12/933,061

(22) PCT Filed: Mar. 5, 2009

(86) PCT No.: PCT/JP2009/054208
§ 371 (c)(1),
(2), (4) Date: Sep. 16, 2010

(87) PCT Pub. No.: WO2009/116404
PCT Pub. Date: Sep. 24, 2009

(65) Prior Publication Data
US 2011/0014030 A1    Jan. 20, 2011

(30) Foreign Application Priority Data

Mar. 18, 2008  (JP) ................................ 2008-069501

(51) Int. Cl.
*F01D 25/16*    (2006.01)
*F16C 33/76*    (2006.01)

(52) U.S. Cl.
USPC .......................................... 384/462; 384/479

(58) Field of Classification Search
USPC .......... 384/462, 477–479, 481, 484; 277/346, 277/353, 371, 427
See application file for complete search history.

(56) References Cited

U.S. PATENT DOCUMENTS 2,176,291 A  *  10/1939  Brotherton .................... 384/480
2,949,333 A  *   8/1960  Lesinski ....................... 384/480
(Continued)

FOREIGN PATENT DOCUMENTS

CN     101055035      10/2007
JP     57119165 U      7/1982
(Continued)

OTHER PUBLICATIONS

RU Office Action for 2010142302 dated Sep. 13, 2011.
(Continued)

*Primary Examiner* — Thomas Diaz
(74) *Attorney, Agent, or Firm* — Lowe Hauptman & Ham, LLP

(57) ABSTRACT

The present invention aims at providing a technique for providing a stepped structure separately to a rotating shaft in a later step of assembly for preventing oil leakage from a bearing box. To this end, the rotating machine of the present invention includes a rotating shaft having a rotating member, a bearing device including a rotating shaft insertion hole larger in diameter than the rotating shaft, an oil thrower provided between an outer circumferential portion of the rotating shaft insertion hole and the rotating shaft, and an additional ring attached to the rotating shaft between the oil thrower and the rotating shaft such as to protrude in a radial direction of the rotating shaft.

8 Claims, 6 Drawing Sheets

(56) References Cited

U.S. PATENT DOCUMENTS

| | | | | |
|---|---|---|---|---|
| 3,447,843 | A | * | 6/1969 | Shipman ................. 384/144 |
| 3,679,277 | A | * | 7/1972 | Dohmen ................. 384/480 |
| 4,396,197 | A | | 8/1983 | Shimizu |
| 4,881,829 | A | * | 11/1989 | Koelsch ................. 384/448 |
| 5,692,756 | A | * | 12/1997 | Altieri ................. 277/353 |

FOREIGN PATENT DOCUMENTS

| | | | |
|---|---|---|---|
| JP | 3052472 | U | 5/1991 |
| JP | 05-071647 | A | 3/1993 |
| JP | 08-068425 | A | 3/1996 |
| JP | 09-229069 | A | 9/1997 |
| JP | 11-062888 | A | 3/1999 |
| RU | 1800183 | A1 | 3/1993 |

OTHER PUBLICATIONS

Chinese Office Action for Application No. 200980109648.X mailed Oct. 31, 2012.
Office Action corresponding to JP 2008-069501, dated Aug. 28, 2012.
ISR for PCT/JP2009/054208 mailed May 26, 2009.
Notification on the Grant of Patent Right for Invention, dated Sep. 6, 2013, corresponds to Chinese Patent Application No. 200980109648.X.

* cited by examiner

ROTATING MACHINE AND ADDITIONAL RING

RELATED APPLICATIONS

The present application is based on International Application Number PCT/JP2009/054208, filed Mar. 5, 2009, and claims priority from, Japanese Application Number 2008-069501, filed Mar. 18, 2008, the disclosures of which are hereby incorporated by reference herein in their entirety.

TECHNICAL FIELD

The present invention relates to a rotating machine equipped with a bearing device and an additional ring.

BACKGROUND ART

Conventionally, turbines such as steam turbines and gas turbines, which rotate their rotating shaft to generate power by expansion of high-temperature operating fluid inside a casing that encases a blade structure therein, have found wide applications in various fields. Various rotating machines other than such turbines have also been used. Bearing devices are essential in such rotating machines for supporting the rotating shaft, and typically lubricating oil is supplied to the inside of the bearing devices.

The bearing device is provided with a mechanism for preventing oil leakage so that lubricating oil does not leak to the outside of the bearing box. This is because oil leakage causes consumption of much lubricating oil inside the bearing box and also causes a stain or the like around the bearing device. An oil leakage prevention mechanism may include, for example as shown in Patent Literature 1, an oil thrower between the bearing box and the rotating shaft. The bearing device is known, for example, as disclosed in Patent Literature 2. A mechanical seal for a shaft is known, for example, as disclosed in Patent Literature 3.

[Patent Literature 1] Japanese Patent Application Laid-Open No. H11-62888 (Paragraph [0002] and FIGS. 3 and 4)
[Patent Literature 2] Japanese Patent Application Laid-Open No. H9-229069
[Patent Literature 3] Japanese Patent Application Laid-Open No. H5-71647

DISCLOSURE OF INVENTION

Problem to be Solved by the Invention

Typically, a sealing member is provided between the oil thrower and the rotating shaft, in such a structure that the lubricating oil does not directly contact the sealing member so as to ensure prevention of oil leakage. One example of such a structure is a stepped structure in which the rotating shaft is preliminarily increased in diameter only at a portion where the sealing member is attached. Thereby, as the lubricating oil is discharged as scavenge oil and flows in an axial direction of the rotating shaft, it is stopped at the portion where this stepped portion is provided, so that direct contact between the lubricating oil and the sealing member is avoided.

However, in some cases with rotating machines such as gas turbines that use various gasses as operating fluid, the above-described stepped structure cannot be preformed on the rotating shaft itself. Gas turbines employ dry gas seals to ensure prevention of gas leakage from the casing, but dry gas seals are subject to predefined specifications and there is only a limited number of types. Also, there is only a slight difference between the diameter of the dry gas seal and the bearing diameter of the bearing device, because of which sometimes the above-described stepped structure cannot be preformed on the rotating shaft itself depending on the assembling process. There are also cases where the above-described stepped structure should preferably be fitted in a later step of assembly because of limitations on the processing of the rotating shaft itself or for the sake of increasing the yield of materials.

Accordingly, an object of the present invention is to provide a rotating machine and an additional ring that enable a stepped structure to be provided to a rotating shaft to prevent oil leakage from the bearing box even in cases where the stepped structure cannot be preformed on the rotating shaft because of inconvenience in manufacturing or assembling processes or for other reasons.

Means for Solving Problem

According to an aspect of the present invention, a rotating machine includes: a rotating shaft having a rotating member; a bearing device having a rotating shaft insertion hole larger in diameter than the rotating shaft, for supporting the rotating shaft extending through the rotating shaft insertion hole with a lubricating oil being supplied to inside of the bearing device; an oil thrower provided between an outer circumferential portion of the rotating shaft insertion hole and the rotating shaft; and an additional ring attached to the rotating shaft between the oil thrower and the rotating shaft such as to protrude in a radial direction of the rotating shaft.

Thereby, a stepped structure is separately provided to the rotating shaft in a later step of assembly at the oil thrower. Scavenge oil flowing along the axial direction of the rotating shaft is stopped by the additional ring forming the stepped structure and changes its flow direction. As a result, direct contact between the lubricating oil and the sealing member that is disposed between the additional ring and the oil thrower is avoided, and prevention of lubricating oil leakage to the outside of the bearing box is more reliably achieved. Accordingly, a stepped structure can be provided to a rotating shaft to prevent oil leakage from the bearing box even in cases where the stepped structure cannot be preformed on the rotating shaft because of inconvenience in manufacturing or assembling processes or for other reasons.

Advantageously, the rotating machine further includes a retainer bolt extending through the additional ring orthogonally to the rotating shaft, for retaining the additional ring to the rotating shaft.

Thereby, the additional ring can be secured to the rotating shaft, so that rattling of the additional ring in the axial and circumferential directions relative to the rotating shaft is prevented and that the additional ring is reliably attached to the rotating shaft.

Advantageously, the rotating machine further includes a seal in an inner circumferential portion of the additional ring between an end portion of the additional ring and the retainer bolt.

Thereby, the rotating shaft and the additional ring make closer contact with each other to enhance sealing properties. The scavenge oil that has traveled through a small gap between the rotating shaft and the additional ring is stopped at the position where the seal is provided, so that oil leakage to the outside of the bearing device is prevented.

Advantageously, in the rotating machine, the seal extends in a direction of the rotating shaft and in a direction of the inner circumferential portion of the additional ring so as to press the seal itself against the rotating shaft and the additional ring, thereby to provide a sealing performance.

Thereby, a sealing function with enhanced sealing properties between the rotating shaft and the additional ring is achieved. The lubricating oil that has traveled through a small gap between the rotating shaft and the additional ring is stopped at the position where the seal is provided, so that oil leakage to the outside of the bearing device is prevented.

Advantageously, in the rotating machine, the seal includes an opening, and takes in seal gas supplied thereto from the opening, thereby to extend in the direction of the rotating shaft and in the direction of the additional ring by pressure of the seal gas.

Thereby, when the seal gas is actively supplied to the seal, the pressure of the seal gas that has filled the opening causes the seal to extend, increasing the force that presses the seal itself against the rotating shaft and the additional ring, whereby the sealing properties can be further enhanced. The lubricating oil that has traveled through a small gap between the rotating shaft and the additional ring is stopped at the position where the seal is provided, so that oil leakage to the outside of the bearing device is prevented. The seal gas is not limited to air but includes other gasses such as nitrogen, as long as it is used for the sealing purpose.

Advantageously, the rotating machine further includes a seal gas supply pipe that supplies the seal gas to the seal.

Thereby, when the seal gas is actively supplied to the opening of the seal, the pressure of the seal gas that has filled the opening can further enhance the sealing properties. The scavenge oil that has traveled through a small gap between the rotating shaft and the additional ring is stopped at the position where the seal is provided, so that oil leakage to the outside of the bearing device is prevented.

Advantageously, in the rotating machine, the retainer bolt includes a seal gas feed port for supplying the seal gas to the seal.

Thereby, rattling of the additional ring in the axial and circumferential directions relative to the rotating shaft is prevented, and prevention of lubricating oil leakage to the outside of the bearing box is more reliably achieved.

Advantageously, in the rotating machine, the seal gas is air.

Thereby, gas used as the seal gas can be delivered easily, whereby enhanced sealing properties by the seal gas can be readily achieved.

Advantageously, the rotating machine further includes a ring-like tolerance ring having a corrugated shape in an inner circumferential portion of the additional ring.

Thereby, rattling of the additional ring in the axial and circumferential directions relative to the rotating shaft is prevented. Also, if used in combination with the retainer bolt, the tolerance ring and the retainer bolt provide a synergetic effect to retain the additional ring on the rotating shaft even during high-speed rotation thereof and to improve precision of core retention, whereby rattling is prevented.

According to another aspect of the present invention, an additional ring provided to a rotating shaft of a rotating member, the rotating shaft being supported by a bearing device to which a lubricating oil is supplied, the additional ring protruding in a radial direction of the rotating shaft to stop flow of the scavenge oil flowing in a direction along the rotating shaft.

Thereby, a stepped structure is separately provided to the rotating shaft in a later step of assembly. Scavenge oil flowing along the axial direction of the rotating shaft is stopped by the additional ring forming the stepped structure and changes its flow direction. Accordingly, a stepped structure can be provided to a rotating shaft to prevent oil leakage from the bearing box even in cases where the stepped structure cannot be preformed on the rotating shaft because of inconvenience in manufacturing or assembling processes or for other reasons.

Advantageously, the additional ring includes a through hole for inserting a retainer bolt for fixedly coupling the rotating shaft and the additional ring, and a seal provided to an inner circumferential portion of the additional ring between the through hole and an end portion of the additional ring.

Thereby, the rotating shaft and the additional ring make closer contact with each other to enhance sealing properties. The scavenge oil that has traveled through a small gap between the rotating shaft and the additional ring is stopped at the position where the seal is provided, so that oil leakage to the outside of the bearing device is prevented.

Advantageously, in the additional ring, the seal extends in a direction of the rotating shaft and in a direction of the inner circumferential portion of the additional ring so as to press the seal itself against the rotating shaft and the additional ring, thereby to provide a sealing performance.

Thereby, a sealing function with enhanced sealing properties between the rotating shaft and additional ring is achieved. The lubricating oil that has traveled through a small gap between the rotating shaft and the additional ring is stopped at the position where the seal is provided, so that oil leakage to the outside of the bearing device is prevented.

Advantageously, in the additional ring, the seal includes an opening, and takes in seal gas supplied thereto from the opening, thereby to extend in the direction of the rotating shaft and in the direction of the additional ring by pressure of the seal gas.

Thereby, when the seal gas is actively supplied to the seal, the pressure of the seal gas that has filled the opening causes the seal to extend, increasing the force that presses the seal itself against the rotating shaft and the additional ring, whereby the sealing properties can be further enhanced. The lubricating oil that has traveled through a small gap between the rotating shaft and the additional ring is stopped at the position where the seal is provided, so that oil leakage to the outside of the bearing device is prevented.

Advantageously, in the additional ring, the seal gas is air.

Thereby, gas used as the seal gas can be delivered easily, whereby enhanced sealing properties by the seal gas can be readily achieved.

Advantageously, the additional ring further includes a ring-like tolerance ring having a corrugated shape provided to an inner circumferential portion of the additional ring.

Thereby, rattling of the additional ring in the axial and circumferential directions relative to the rotating shaft is prevented. Also, if used in combination with the retainer bolt, the tolerance ring and the retainer bolt provide a synergetic effect to retain the additional ring on the rotating shaft even during high-speed rotation thereof and to improve precision of core retention, whereby rattling is prevented.

Effect of the Invention

According to the present invention, a stepped structure can be provided to a rotating shaft to prevent oil leakage from the bearing box even in cases where the stepped structure cannot be preformed on the rotating shaft because of inconvenience in manufacturing or assembling processes or for other reasons.

BRIEF DESCRIPTION OF DRAWINGS

FIG. 6-1 is a perspective view of a seal according to Example 1;

FIG. 6-2 is a configuration diagram of another spring according to Example 1;

FIG. 6-3 is a configuration diagram of another seal according to Example 1;

FIG. 6-4 is a configuration diagram of another seal according to Example 1;

FIG. 6-5 is a configuration diagram of another seal according to Example 1;

Figure 1:
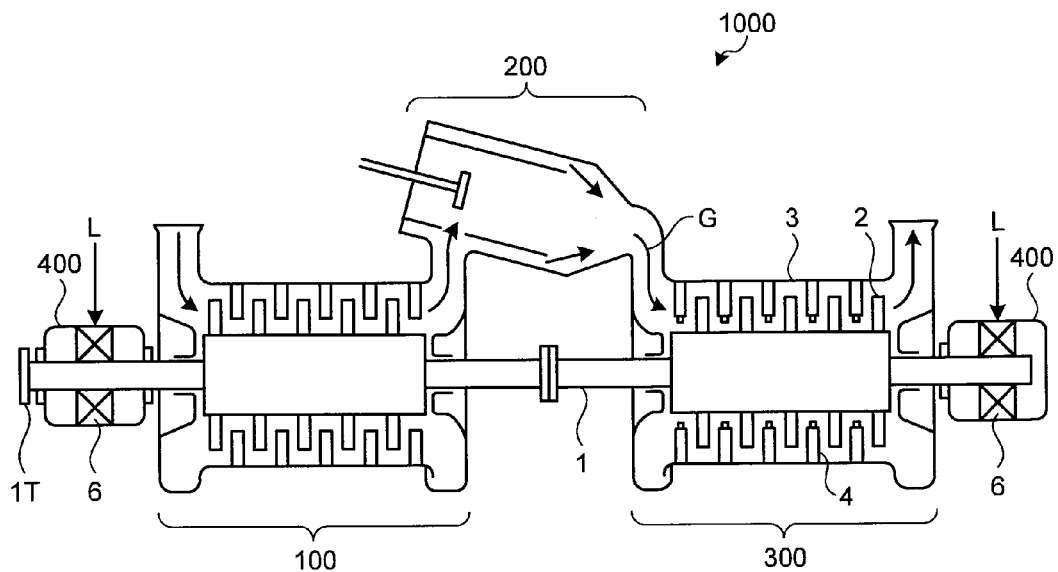
FIG. 1 is a schematic diagram of a gas turbine according to Example 1.

EXPLANATIONS OF LETTERS OR NUMERALS 1000 gas turbine
100 compressor
200 combustor
300 turbine
400, 401 bearing device
1 rotating shaft
2 rotor blade
3 casing
4 nozzle
5 bearing box
5a rotating shaft insertion hole
6 bearing pad
7, 16 oil leakage prevention mechanism
8 oil thrower
9 additional ring
9a seal groove
9b tolerance ring groove
9c through hole
10 sealing member
11 seal
11c O-ring
11d packing
11e resilient member
12 ring
12a, 12d, 12e opening
13 spring
14, 20 retainer bolt
15 tolerance ring
17 seal gas supply pipe
18 second oil thrower
19 second sealing member
21 seal gas feed port
22 seal pocket
G combustion gas
L lubricating oil
E scavenge oil
M oil film
w projection
SA seal air
P seal gas feed pump

BEST MODE(S) FOR CARRYING OUT THE INVENTION

The present invention will be hereinafter described in detail with reference to the drawings. The embodiments herein described shall not limit the invention. The constituent elements in the following embodiments include those a person skilled in the art can readily envisage, those substantially identical, and those that fall under the category of so-called equivalents. While a gas turbine is given as one example of a rotating machine below, and examples in which the present invention is applied to the gas turbine are described, the objects to which the present invention may be applicable are not limited to this.

EXAMPLE 1

FIG. 1 is a schematic diagram of a gas turbine according to Example 1 of the present invention. First, the structure of the gas turbine 1000 which is a rotating machine will be described with reference to FIG. 1 and FIG. 2.

The gas turbine 1000 is configured with a compressor 100, a combustor 200, a turbine 300, and bearing devices 400 as main parts, as shown in FIG. 1. The compressor 100 takes in air and compresses it. Part of the power obtained by the turbine 300 to be described later is used to power the compressor 100. The combustor 200 mixes the air compressed by the compressor 100 with fuel to produce combustion gas G.

The turbine 300 introduces the combustion gas G produced in the combustor 200 to expand it and blows it to rotor blades 2 provided on the rotating shaft 1, thereby converting thermal energy of the combustion gas G to mechanical rotary energy to generate power. The bearing devices 400 are provided to both ends of the rotating shaft 1. The bearing devices 400 support both ends of the rotating shaft 1 with bearing pads 6 disposed inside. The rotating shaft 1 is supported by the bearing pads 6 as it rotates. Lubricating oil L is supplied to the inside of the bearing devices 400 to lubricate between the bearing pads 6 and rotating shaft 1.

The turbine 300 includes, as shown in FIG. 1, the rotating shaft 1, a plurality of rotor blades 2, a casing 3 encasing the rotating shaft 1 and the rotor blades 2, and a plurality of nozzles 4 fixed to the casing 3. The rotor blades 2 and the nozzles 4 are alternately arranged along an axial direction of the rotating shaft 1. The rotor blades 2 spin the rotating shaft 1 by the force of the combustion gas G jetted out from the combustor 200 and flowing along the axial direction of the rotating shaft 1. Rotary energy of the rotating shaft 1 is extracted from a shaft end 1T of the rotating shaft 1 on the side of the compressor 100.

Figure 2:
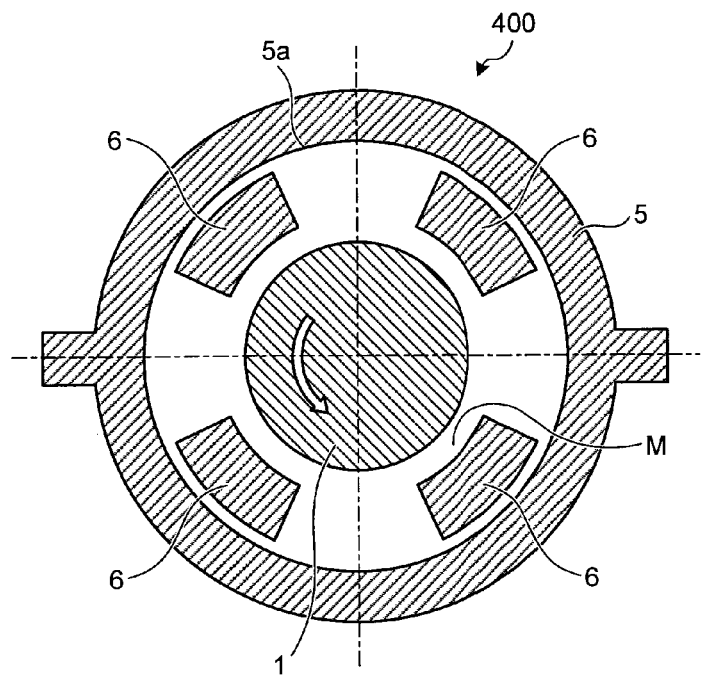
FIG. 2 is a cross-sectional front view of a bearing device according to Example 1.
Figure 3:
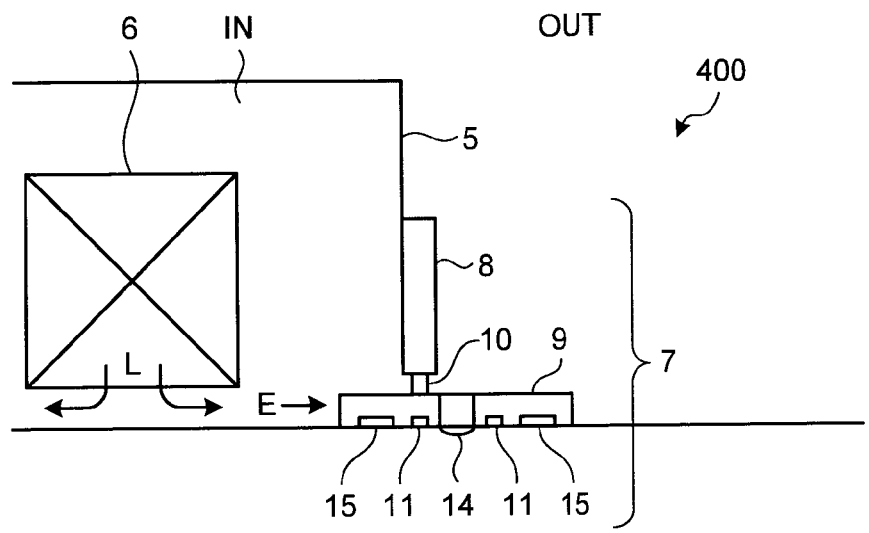
FIG. 3 is a cross-sectional side view of an oil leakage prevention mechanism and its surroundings according to Example 1.
Figure 4:
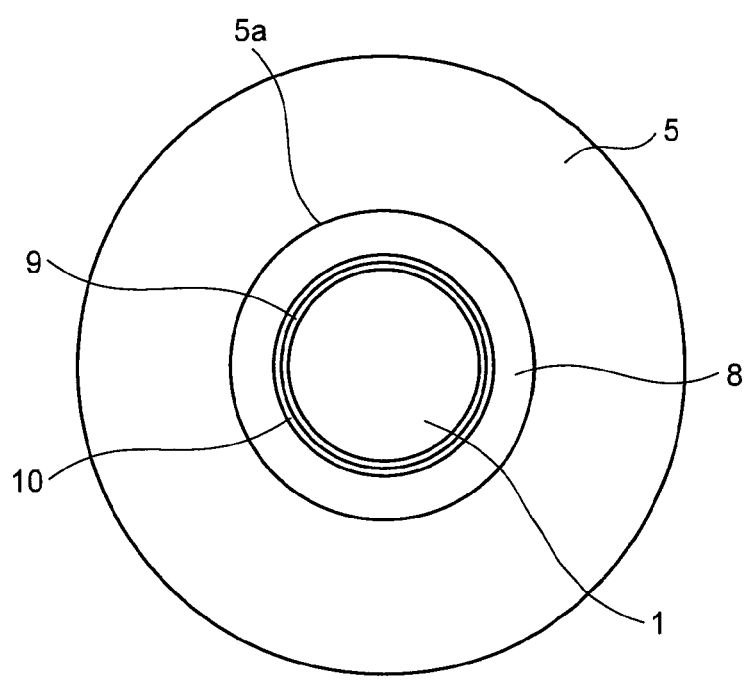
FIG. 4 is a cross-sectional front view of the oil leakage prevention mechanism and its surroundings according to Example 1.

FIG. 2 is a cross-sectional front view of the bearing device according to Example 1 of the present invention. FIG. 3 and FIG. 4 are a cross-sectional side view and a cross-sectional front view of an oil leakage prevention mechanism and its surroundings, the mechanism being one constituent element of the bearing device according to Example 1. The bearing device 400 according to Example 1 will be described with reference to FIG. 2 and FIG. 3.

The bearing device 400 includes, as shown in FIG. 2 and FIG. 3, a bearing box 5, a plurality of bearing pads 6 disposed inside the bearing box 5, and an oil leakage prevention mechanism 7 that prevents the lubricating oil L from leaking to the outside of the bearing box 5. The bearing box 5 has a rotating shaft insertion hole 5a provided thereto for the rotating shaft 1 to be inserted therein, the hole being larger in diameter than the rotating shaft 1. The oil leakage prevention mechanism 7 is disposed between an outer circumferential portion of the rotating shaft insertion hole 5a and the rotating shaft 1. The lubricating oil L supplied to the inside of the bearing box 5 flows along the axial direction of the rotating shaft 1 as the rotating shaft 1 rotates, forming an oil film M between the rotating shaft 1 and the bearing pads 6 thereby to support the rotating shaft 1. The lubricating oil L is stopped from leaking to the outside of the bearing box 5 by means of the oil leakage prevention mechanism 7.

As shown in FIG. 4, the oil leakage prevention mechanism 7 includes an oil thrower 8, an additional ring 9, a sealing member 10, seals 11, a retainer bolt 14, and tolerance rings 15. The oil thrower 8 is disposed on an outer circumferential portion of the rotating shaft insertion hole 5a, covering most of the rotating shaft insertion hole 5a together with the rotating shaft 1. The additional ring 9 is attached to an outer circumferential portion of the rotating shaft 1 to create a stepped structure that protrudes in a radial direction of the rotating shaft 1. The sealing member 10 is disposed between the oil thrower 8 and the additional ring 9. The rotating shaft 1, the oil thrower 8, the additional ring 9, and the sealing member 10 together seal the rotating shaft insertion hole 5a. As will be described later, the retainer bolt 14 is provided to extend through the additional ring 9 orthogonally to the rotating shaft 1, and the seals 11 and the tolerance rings 15 are provided to an inner circumferential portion of the additional ring 9.

The oil leakage prevention mechanism 7 thus seals the rotating shaft insertion hole 5a and divides the inside IN and outside OUT of the bearing box 5. This prevents leakage of the lubricating oil L to the outside of the bearing box 5.

Figure 5:
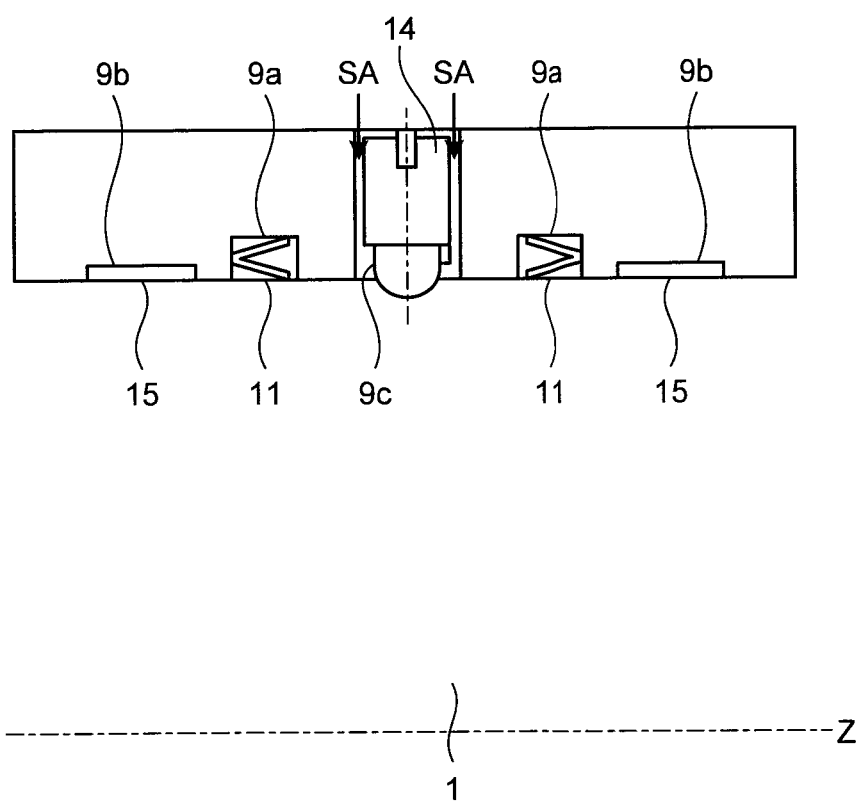
FIG. 5 is a cross-sectional side view of an additional ring and its surroundings according to Example 1.
Figures 1, 6:
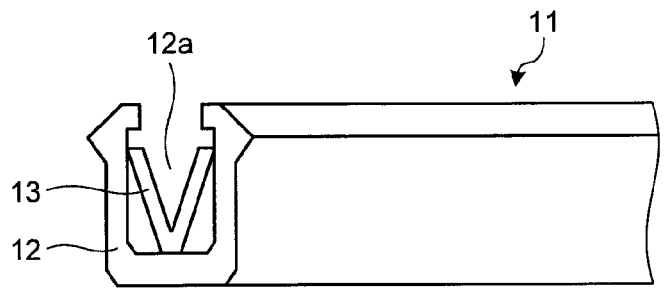
Figures 2, 6:
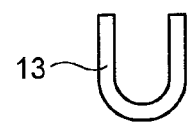
Figures 3, 6:
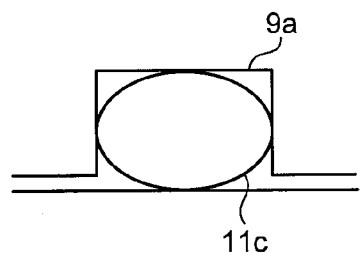
Figures 4, 6:
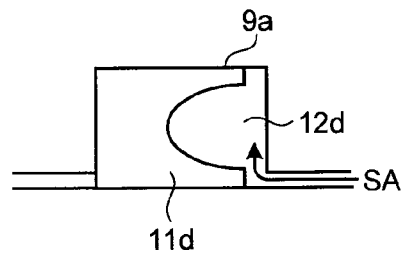
Figures 5, 6:
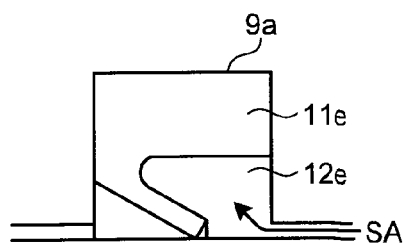
Figure 7:
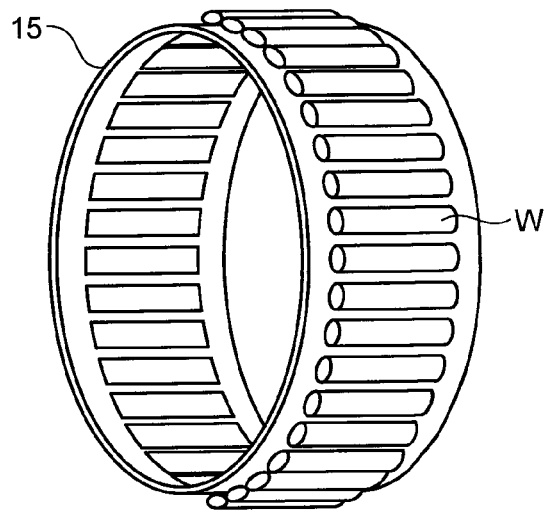
FIG. 7 is a perspective view of a tolerance ring according to Example 1.

FIG. 5 is a cross-sectional side view of the additional ring and its surroundings according to Example 1 of the present invention. FIG. 6-1 to Example 6-5 are perspective views of a seal according to Example 1. FIG. 7 is a perspective view of a tolerance ring according to Example 1. The additional ring 9, the seal 11, the retainer bolt 14, and the tolerance ring 15 according to Example 1 will be described with reference to FIG. 5 to FIG. 7.

The additional ring 9 includes, as shown in FIG. 5, seal grooves 9a, tolerance ring grooves 9b, and a through hole 9c in the inner circumference thereof. The through hole 9c is a through hole provided orthogonally to the rotating shaft 1 in a central portion in the lengthwise direction of the additional ring 9. The seal grooves 9a are provided in the inner circumference of the additional ring 9 slightly distanced from the through hole 9c toward one end or both ends of the additional ring 9. The tolerance ring grooves 9b are provided in the inner circumference of the additional ring 9 slightly distanced from the seal grooves 9a further toward both ends of the additional ring 9, or, on the inner side of the seal grooves 9a.

With the additional ring 9 attached between the rotating shaft 1 and the sealing member 10, a stepped portion protruding in a radial direction of the rotating shaft 1 is formed, and thus the rotating shaft 1 can be formed with a stepped structure. Thereby, scavenge oil E flowing along the axial direction of the rotating shaft 1, which is the lubricating oil L discharged as scavenge oil after it has been delivered to the inside of the bearing device 400, is stopped by the additional ring 9 forming the stepped structure and changes its flow direction. This prevents the scavenge oil E from directly contacting the sealing member 10 that is disposed between the additional ring 9 and the oil thrower 8, whereby prevention of lubricating oil L leakage to the outside of the bearing box 5 is more reliably achieved.

Some rotating machines may employ a dry gas seal for the sealing purpose, for example, in order to ensure prevention of gas leakage from the casing. For example, the gas turbine 1000 shown in FIG. 1 may include dry gas seals in one or both of the bearing devices 400 on the side of the compressor 100 and on the side of the turbine 300, between the rotating shaft 1 and one or both of the compressor 100 and the turbine 300. Dry gas seals are subject to predefined specifications and there is little scope for selection of types, and sometimes there is only a slight difference between the inside diameter of the selected dry gas seal and the outside diameter of the bearing device 400 of the rotating shaft 1. Meanwhile, dry gas seals generally do not have a horizontally-split structure and need to be assembled in an axial direction. If a stepped structure such as the one described above having a larger diameter than the outside diameter of the bearing device 400 is provided integrally with the rotating shaft 1, there may be cases where the dry gas seal cannot be assembled by passing it through the bearing device 400 of the rotating shaft 1 depending on the assembling process. According to the present example, even in such cases, the rotating shaft 1 can be readily formed with a stepped structure, so as to prevent leakage of lubricating oil L to the outside of the bearing box 5.

The additional ring 9 may be directly attached to the rotating shaft 1, or, it may be provided with the seal grooves 9a, the tolerance ring grooves 9b, and the through hole 9c in the inner circumference thereof so as to include the seals 11, the tolerance rings 15, and the retainer bolt 14 to be described later. The seal 11 has a ring 12 having an opening 12a and a ring-like spring 13 provided in the opening 12a, as shown in FIG. 6-1. The spring 13 is a stainless steel plate having superior bending fatigue resistance, the plate being bent such as to have a V-shaped cross section in the opening 12a. The cross section here refers to a sectional plane orthogonal to the circumferential direction of the spring 13.

Seals 11 are provided one each in the seal grooves 9a at two locations in the inner circumference of the additional ring 9, between the through hole 9c and both ends of the additional ring 9 as shown in FIG. 5. The opening 12a is oriented toward the through hole 9c. The V-shaped springs 13 are provided such that they open toward the same direction as the openings 12a. Preferably, from the viewpoint of stability, the seals 11 should be provided at two locations in the lengthwise direction of the additional ring 9 with the through hole 9c being positioned in the middle.

The spring 13 uses its restoring force of bent stainless steel. That is, with the seals 11 being set in the seal grooves 9a as shown in FIG. 5, the restoring force of stainless steel forming the springs 13 is applied between the rotating shaft 1 and the seal grooves 9a. Namely, the springs 13 provide the seals 11 with a spring action force. Thus the springs 13 extend in the direction of the rotating shaft 1 and in the direction of the seal groove 9a of the additional ring 9, thereby pressing the ring 12 against the rotating shaft 1 and the additional ring 9 to achieve a sealing function with enhanced sealing properties. Furthermore, with the openings 12a being oriented toward the through hole 9c, seal air SA which is a seal gas given for the sealing purpose is actively supplied from the through hole 9c to the seals 11, and can be introduced into the openings 12a. As a result, the openings 12a extend in the radial direction of the rotating shaft 1, i.e., in the direction of the rotating shaft 1 and in the direction of the seal grooves 9a of the additional ring 9, increasing the force that presses the rotating shaft 1 and the additional ring 9, whereby the sealing properties can be further enhanced. The seal air SA is supplied to the seals 11 through, for example, a small gap in the through hole 9c of the additional ring 9 through which the retainer bolt 14 is passed. The springs 13 need not necessarily have a V-shaped cross section, but instead, for example as shown in FIG. 6-2, they may have a U-shaped cross section or the like. The shape is not limited to these, as long as the spring has a spring action force and can generate a pressing force against the rotating shaft 1 and the additional ring 9.

Another possible configuration for the seal 11 is an O-ring 11c as shown in FIG. 6-3, or a packing 11d having an opening 12d as shown in FIG. 6-4, or a resilient member 11e having an opening 12e as shown in FIG. 6-5. Resilient force of the O-ring 11c, the packing 11d, or the resilient member 11e acts on a pressing force against the rotating shaft 1 and the additional ring 9, whereby the sealing properties between the rotating shaft 1 and additional ring 9 can be enhanced. In the case with the packing 11d or the resilient member 11e, the seal air SA can be actively supplied to their respective openings 12d or 12e. As a result, the packing 11d or the resilient member 11e extends in the direction of the rotating shaft 1 and in the direction of the seal groove 9a of the additional ring 9 by the pressure of the seal air SA, increasing the force that presses the packing 11d or resilient member 11e itself against the rotating shaft 1 and the additional ring 9, whereby the sealing properties can be further enhanced.

As described above, the spring action force generated by the spring 13 forming the seal 11, or the resilient force of an O-ring 11c, packing 11d, or resilient member 11e, causes the seal 11 to extend in the direction of the rotating shaft 1 and in the direction of the seal groove 9a of the additional ring 9. As a result, the seal 11 itself is pressed against the rotating shaft 1 and the additional ring 9, whereby a sealing function is achieved. Thereby, the scavenge oil E passing through the small gap between the rotating shaft 1 and the additional ring 9 is stopped at the position where the seal 11 is provided, whereby oil leakage to the outside of the bearing box 5 is prevented more effectively. With the seal air SA being actively supplied to the opening 12a of the seal 11, or the opening 12d of the packing 11d, or the opening 12e of the resilient member 11e, the seal 11, the packing 11d, or the resilient member 11e extends in the direction of the rotating shaft 1 and in the direction of the seal groove 9a of the additional ring 9 by the pressure of the seal air SA. This results in an increases in the force that presses the seal 11, the packing 11d, or the resilient member 11e itself against the rotating shaft 1 and the additional ring 9, whereby the sealing properties can be further enhanced. Seal gas is not limited to air such as the seal air SA but may be other gasses such as nitrogen, as long as it is used for the sealing purpose.

The retainer bolt 14 is provided to extend through the additional ring orthogonally to the rotating shaft 1, as shown in FIG. 5. The retainer bolt 14 is screwed into the through hole 9c so as to extend through the additional ring 9. The through hole 9c extends through the additional ring 9 in a direction orthogonal to the rotating shaft 1, and is formed with a female screw corresponding to the retainer bolt 14. From the viewpoint of safety, it is preferable to provide the through hole 9c at about three circumferential locations in a central portion in the axial direction of the additional ring 9 (axial direction of the rotating shaft 1), with the retainer bolt 14 being disposed therein.

Thus the additional ring 9 is secured to the rotating shaft 1 with the retainer bolts 14. This prevents rattling of the additional ring 9 in the axial and circumferential directions relative to the rotating shaft 1, and the additional ring 9 can be reliably attached to the rotating shaft 1.

The tolerance ring 15 is provided with a plurality of projections w along the axial direction and as a whole takes on a corrugated ring shape, as shown in FIG. 6. From the viewpoint of stability, it is preferable to provide one each tolerance ring near both ends in the axial direction of the additional ring 9 (axial direction of the rotating shaft 1).

Each of the projections w of the tolerance ring 15 exhibits a spring action, and the spring action force is proportional to the amount of deformation of the corrugated shape. The spring coefficient changes according to material thickness, and pitch, width, height, shape, and the like of corrugation. The spring action force of the tolerance ring 15 can help couple the additional ring 9 and the rotating shaft 1 fixedly. Namely, with the tolerance rings 15 being set in the tolerance ring grooves 9b as shown in FIG. 5, the spring action force acts between the rotating shaft 1 and the tolerance ring grooves 9b, thereby retaining the additional ring 9 to the rotating shaft 1.

Thus the tolerance ring 15 can prevent rattling of the additional ring 9 in the axial and circumferential directions relative to the rotating shaft 1. Also, it provides a synergetic effect with the retainer bolts 14, enabling retention of the additional ring 9 even during high-speed rotation of the rotating shaft 1 and improving precision of core retention, whereby rattling is prevented.

Next, how the additional ring 9 according to Example 1 of the present invention is attached to the rotating shaft 1 will be described. First, the seals 11 are fitted in the seal grooves 9a formed in the additional ring 9. Here, as described above, the seals 11 are set such that their openings 12a are oriented toward the through hole 9c. The tolerance rings 15 are fitted in the tolerance ring grooves 9b.

Next, the additional ring 9 is attached on the outer circumference of the rotating shaft 1. Here, attention should be paid to the position of the oil thrower 8, so that the additional ring 9 is disposed between the oil thrower 8 and the rotating shaft 1.

Lastly, the retainer bolts 14 are inserted into the through holes 9c. Here, they are tightened so that the additional ring 9 is securely attached to the rotating shaft 1 without any rattling in the radial and circumferential directions relative to the rotating shaft 1. With these steps, the additional ring 9 is attached to the rotating shaft 1.

EXAMPLE 2

Figure 8:
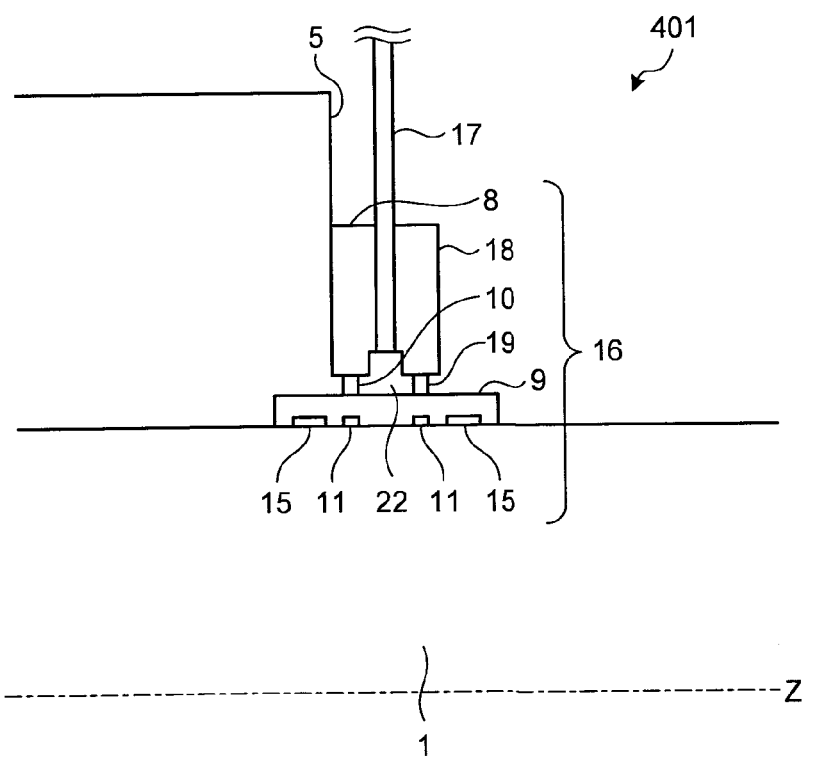
FIG. 8 is a cross-sectional side view of an oil leakage prevention mechanism and its surroundings according to Example 2.
Figure 9:
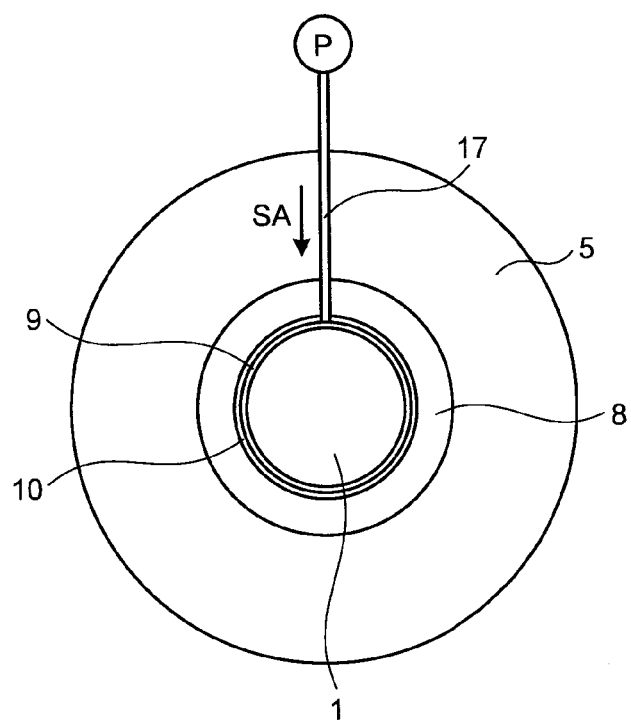
FIG. 9 is a cross-sectional front view of the oil leakage prevention mechanism and its surroundings according to Example 2.
Figure 10:
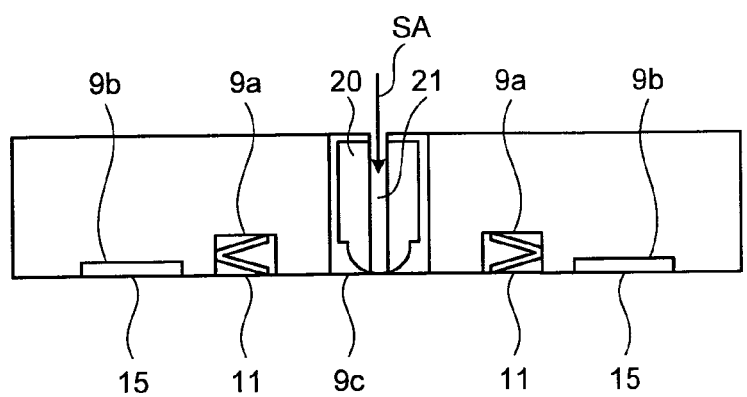
FIG. 10 is a cross-sectional side view of an additional ring and its surroundings according to Example 2.
Figure 10:
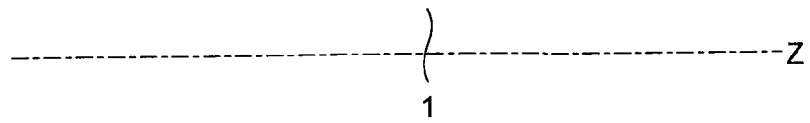

FIG. 8 is a cross-sectional side view of an oil leakage prevention mechanism and its surroundings according to Example 2 of the present invention. FIG. 9 is a cross-sectional front view of the oil leakage prevention mechanism and its surroundings according to Example 2. FIG. 10 is a cross-sectional side view of an additional ring and its surroundings according to Example 2. A bearing device 401 and an oil leakage prevention mechanism 16 according to Example 2 will be described with reference to FIG. 8 to FIG. 10. The components identical to those in the structure of the oil leakage prevention mechanism 7 according to Example 1 are given the same reference numerals and repetitive descriptions thereof will be omitted.

As shown in FIG. 8 and FIG. 9, the oil leakage prevention mechanism 16 includes an oil thrower 8, a second oil thrower 18, a sealing member 10, a second sealing member 19, an additional ring 9, seals 11, tolerance rings 15, a seal gas feed pump P, a seal gas supply pipe 17, a retainer bolt 20, and a seal pocket 22. The seal pocket 22 is an annular space enclosed by the oil thrower 8, the second oil thrower 18, and the rotating shaft 1, to which the seal gas supply pipe 17 to be described later is connected. The second oil thrower 18 is provided slightly away from the oil thrower 8 in the lengthwise direction of the rotating shaft 1, with the seal pocket 22 therebetween, as shown in FIG. 8. The second sealing member 19 is provided between the second oil thrower 18 and the additional ring 9.

The seal gas feed pump P is disposed to perform a pump function to feed seal air SA to the seals 11 through the seal gas supply pipe 17 to be described later. The seal gas supply pipe 17 is a pipe that connects the seal gas feed pump P with the seal pocket 22, as shown in FIG. 9. Since the seal pocket 22 is an annular space, even with just one seal gas supply pipe 17 connected to the seal pocket 22, the seal air SA supplied from the seal gas supply pipe 17 is delivered to the entire circumference of the additional ring 9. This, of course, does not exclude the possibility of providing a plurality of seal gas supply pipes 17. Seal gas is not limited to air such as the seal air SA but may be other gasses such as nitrogen, as long as it is used for the sealing purpose.

As shown in FIG. 8 and FIG. 10, the retainer bolt 20 includes a seal gas feed port 21 for passing the seal air SA supplied from the seal gas supply pipe 17. The seal gas feed port 21 is a through hole extending through the retainer bolt 20 in the lengthwise direction thereof. In the present example, there is only one seal gas feed port 21, but there may be a plurality of ports in the lengthwise direction of the retainer bolt 20.

The seal air SA supplied from the seal gas feed pump P through the seal gas supply pipe 17 to the retainer bolt 20 passes through the seal gas feed port 21. The seal air SA that has come out from an exit end of the seal gas feed port 21 passes through a small gap between the rotating shaft 1 and the additional ring 9 and proceeds along the lengthwise direction of the rotating shaft 1. When it reaches the seal grooves 9*a* in which seals 11 are provided, it is delivered to the openings 12*a*, and the air pressure of the delivered seal air SA causes the V-shaped openings of the springs 13 in the seals 11 to further open toward radial directions of the rotating shaft 1. This causes the seals 11 to be firmly pressed between the additional ring 9 and rotating shaft 1, whereby the sealing properties between the additional ring 9 and rotating shaft 1 can be further enhanced.

As described above, with the seal gas feed port 21 provided in the retainer bolt 20 to supply the seal air SA to the seals 11, the seal air SA is delivered through the seal gas feed port 21 to the inner surface side of the additional ring 9 when tightening the additional ring 9. Thereby, the seal air SA is actively supplied to the openings 12*a* of the seals 11, and the pressure of the seal air SA extends the seals 11 in the direction of the rotating shaft 1 and in the direction of the seal grooves 9*a* of the additional ring 9. This results in an increase in the force that presses the seal 11 itself against the rotating shaft 1 and the additional ring 9, whereby the sealing properties can be further enhanced. As a result of this, the scavenge oil E that has traveled through the small gap between the rotating shaft 1 and the additional ring 9 is stopped at the position where the seal 11 is provided, whereby oil leakage to the outside of the bearing box 5 is prevented.

Industrial Applicability

As described above, the rotating machine and additional ring according to the present invention are useful when providing a stepped structure separately to a rotating shaft in a later step of assembly for preventing oil leakage from a bearing box, even in cases where the stepped structure cannot be preformed to the rotating shaft because of inconvenience in manufacturing or assembling processes or for other reasons.

The invention claimed is:

1. A rotating machine comprising:
    a rotating shaft having a rotating member;
    a bearing device having a rotating shaft insertion hole larger in diameter than the rotating shaft, for supporting the rotating shaft extending through the rotating shaft insertion hole with a lubricating oil being supplied to inside of the bearing device;
    an oil thrower provided between an outer circumferential portion of the rotating shaft insertion hole and the rotating shaft;
    an additional ring attached to the rotating shaft between the oil thrower and the rotating shaft such as to protrude in a radial direction of the rotating shaft;
    a retainer bolt extending through the additional ring orthogonally to the rotating shaft, for retaining the additional ring to the rotating shaft;
    a seal in an inner circumferential portion of the additional ring between an end portion of the additional ring and the retainer bolt, wherein
    the seal extends in a direction of the rotating shaft and in a direction of the inner circumferential portion of the additional ring so as to press the seal itself against the rotating shaft and the additional ring, thereby to provide a sealing performance,
    the additional ring includes a through hole through which the retainer bolt is inserted and seal gas is supplied,
    the seal includes an opening to receive the seal gas supplied from the through hole, thereby to extend in the direction of the rotating shaft and in the direction of the additional ring by pressure of the seal gas.

2. The rotating machine according to claim 1, further comprising a seal gas supply pipe that supplies the seal gas to the seal.

3. The rotating machine according to claim 1, wherein the retainer bolt includes a seal gas feed port for supplying the seal gas to the seal.

4. The rotating machine according to claim 1, wherein the seal gas is air.

5. The rotating machine according to claim 1, further comprising a ring-like tolerance ring having a corrugated shape in the inner circumferential portion of the additional ring.

6. An additional ring provided to a rotating shaft of a rotating member, the rotating shaft being supported by a bearing device to which a lubricating oil is supplied, the additional ring protruding in a radial direction of the rotating shaft to stop flow of the lubricating oil flowing in a direction along the rotating shaft, comprising:
    a through hole for inserting a retainer bolt for fixedly coupling the rotating shaft and the additional ring, and for supplying seal gas; and
    a seal provided to an inner circumferential portion of the additional ring between the through hole and an end portion of the additional ring, wherein
    the seal extends in a direction of the rotating shaft and in a direction of the inner circumferential portion of the additional ring so as to press the seal itself against the rotating shaft and the additional ring, thereby to provide a sealing performance,
    the seal includes an opening to receive the seal gas supplied from the through hole, thereby to extend in the direction of the rotating shaft and in the direction of the additional ring by pressure of the seal gas.

7. The additional ring according to claim 6, wherein the seal gas is air.

8. The additional ring according to claim 6, further comprising a ring-like tolerance ring having a corrugated shape provided to the inner circumferential portion of the additional ring.

* * * * *